June 30, 1925.

A. WAHLE

CENTRIFUGAL BLOWER

Filed May 11, 1923

Inventor
Adolph Wahle
Lloyd L. Evans

By

Attorney

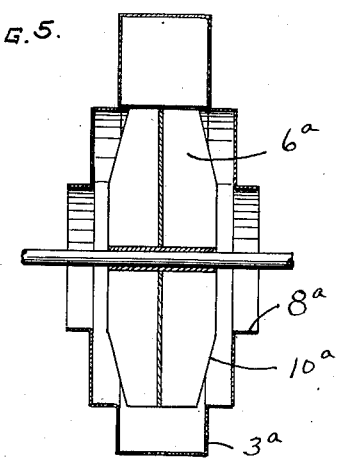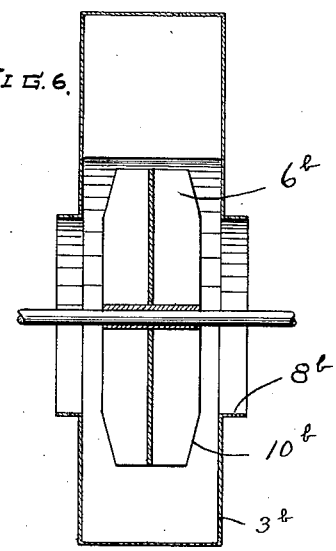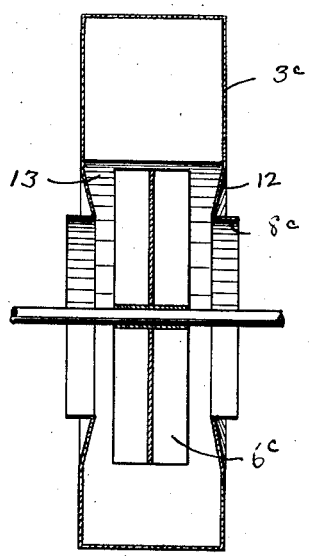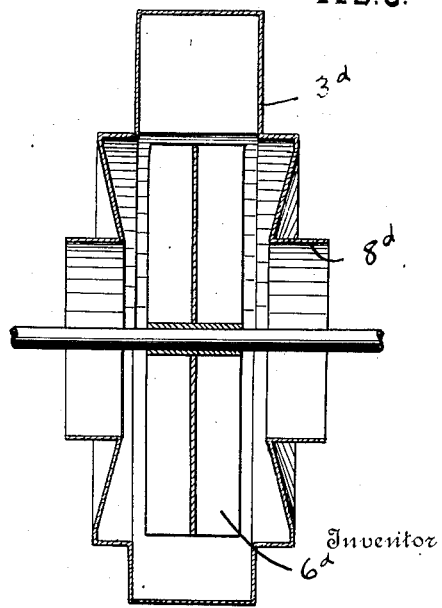

Patented June 30, 1925.

1,543,740

UNITED STATES PATENT OFFICE.

ADOLPH WAHLE, OF DAVENPORT, IOWA.

CENTRIFUGAL BLOWER.

Application filed May 11, 1923. Serial No. 638,220.

*To all whom it may concern:*

Be it known that I, ADOLPH WAHLE, a citizen of the United States, residing at Davenport, in the county of Scott and State of Iowa, have invented a certain new and useful Improvement in Centrifugal Blowers, of which the following is a full, clear, and exact description, reference being had to the accompanying drawings.

My invention relates generally to centrifugal blowers or pumps of the type in which the fluid enters axially and is discharged circumferentially, and more particularly to centrifugal air blowers of the type in which a rotor having a series of impeller blades radiating from the hub is journaled within a casing which is usually of volute form and has its circumferential wall spaced from the periphery of the rotor to provide a chamber surrounding the rotor into which the air or other fluid is thrown from the rotor and in which the fluid is whirled rapidly in the direction of rotation of the rotor by the action of the rotor blades, and compressed in its movement along the periphery of the casing to the tangential outlet.

Blowers of the simple paddle wheel type as heretofore constructed have been of comparatively low efficiency and efforts to increase the efficiency have resulted in various complicated rotor and casing constructions which, while they increase somewhat the efficiency of the blower, are expensive to manufacture and still leave much to be desired from the standpoint of efficiency.

It is the object of the present invention to provide a blower in which both the blower and casing are of very simple construction but in which the blower and casing are so designed one with respect to the other that a high degree of efficiency is attained. In other words it is the object of the present invention to provide a blower in which a rotor of given size at a given speed of rotation will deliver more air or air at greater pressures than corresponding rotors of blowers as heretofore constructed.

A further object is to provide a blower with a rotor so designed that eddy currents within the rotor and about the periphery of the rotor, which interfere with the free flow of fluid through the rotor and casing, cause a wasteful expenditure of power and tend to unbalance the rotor and cause noisy operation, are practically eliminated.

Other objects will be apparent from the following description and accompanying drawings.

The following description and accompanying drawings set forth in detail the application of the present invention to blowers ranging from the low pressure large volume type to the high pressure type, the constructions illustrated and described, however, embodying but one of the various mechanical forms in which the principle of the invention may be employed.

Reference should be had to the accompanying drawings forming a part of this specification in which Figure 1 is a vertical section through the blower in a plane at right angles to the axis of the rotor.

Figs. 5 to 8 are sections similar to Fig. 2 showing blowers in which the portions are somewhat varied.

Figure 1:
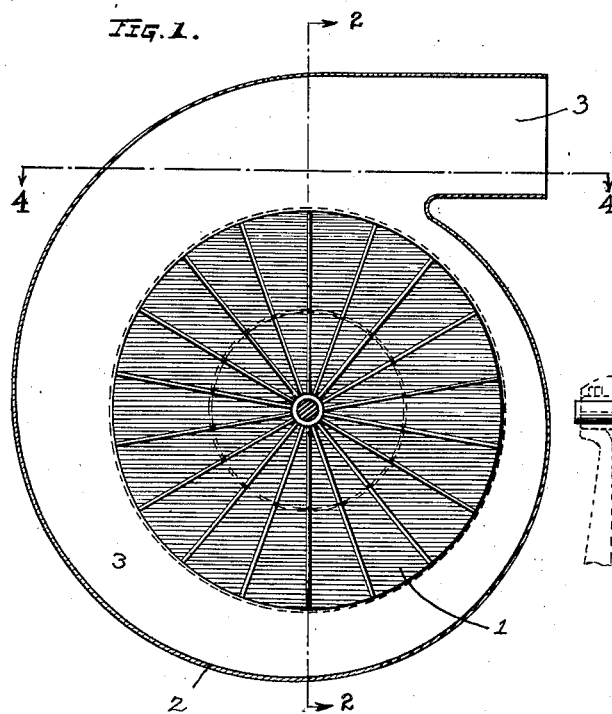

Referring to the accompanying drawings, the rotor which is referred to generally by the numeral 1 is enclosed within a volute casing 2 of considerably greater diameter and is eccentrically disposed within the casing 2 in accordance with the usual practice as shown in Fig. 1, in order to provide a chamber 3 around the periphery of the rotor which gradually increases in size toward the tangential outlet of the casing.

Figure 3:
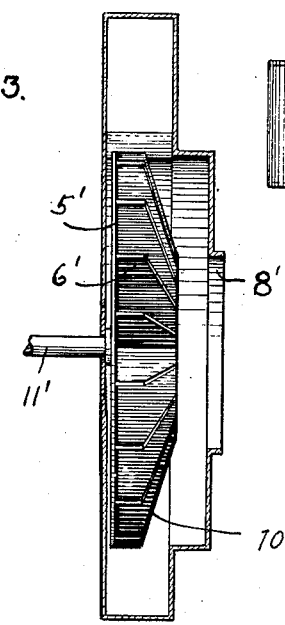
Fig. 3 is a vertical section through the casing showing a blower of the single inlet type.
Figure 4:
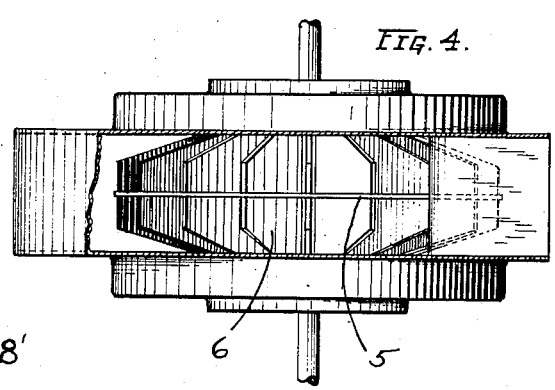
Fig. 4 is a section on line 4—4, Fig. 1.

The rotor 1 consists of a central disk 5 and radially disposed blades 6 secured to opposite faces of the disk and to the central hub 7, the blades 6 being of uniform size. The rotor is mounted centrally between the side walls of the casing and the width of the rotor is such that there is a substantial clearance between the side edges of the blades and the walls of the casing. The casing has inlet openings 8 and 9 on opposite sides thereof which are coaxial with the rotor and of a diameter equal to or greater than one-half the diameter of the rotor. For a high pressure blower the openings will be substantially less than the diameter of the rotor, for example one-half the diameter or even less, and for blowers designed for delivering the air at lower pressures the openings will be of larger diameter and approach the diameter of the rotor. The blower herein shown is of the double inlet type which is usually preferable since the side thrust on the rotor is balanced. The present invention, however, is applicable to blowers of the single inlet type, in which case the disk lies closely adjacent the closed side of the casing as shown in Fig. 3, and the blades lie upon the side thereof toward the inlet, the casing and blades being otherwise formed as herein described.

The rotor blades as shown herein have their outer side edges opposite the casing openings lying in a plane parallel with the planes of the casing openings and spaced inwardly a substantial distance from the inlet openings to provide clearance spaces between the rotor and sides of the casing through which air may pass directly from the inlet openings between the rotor and casing to the peripheral chamber of the casing. The clearance between the rotor and the edges of the inlet openings varies somewhat for the high pressure and low pressure blowers but this clearance should always be equal to or more than substantially half the width of the blades at one side of the rotor disk. The clearance is increased for the large volume, low pressure blowers.

In centrifugal blowers of the type herein disclosed the greater part of the air discharged from the periphery of the rotor is discharged adjacent the disk, the pressure of the air upon the inner portions of the outer ends of the blades being considerably higher than adjacent the outer edges of the tips of the blades. Furthermore I have discovered the low pressure behind the outer corner portions of the blades tends to cause eddy currents, thereby materially reducing the efficiency and causing noisy operation. This defect I remedy by providing a wide clearance between the rotor and casing which will permit free flow of air from the inlet toward the disk and then outwardly toward the periphery of the casings.

In blowers in which the rotor blades are of greater diameter than the inlet opening I taper the blades inwardly as at 10 toward the disk from a point directly opposite the edge of the opening to their outer ends, which leaves intact the portion of the blade which is effective for creating pressure in the discharge chamber surrounding the rotor and removes the portion tending to create eddy currents. In addition, the tapered blade construction provides a gradually widening passage from the inlets to the rapidly moving air column surrounding the rotor so that air will be constantly entrained and flow continuously from the inlet opening toward the rotor disk where it is thrown forcibly outwardly into the volute and carried to the discharge opening, effectively counteracting any tendency of the rotor to create low pressure areas which would induce eddy currents interfering with the free movement of air in the desired direction.

Figure 2:
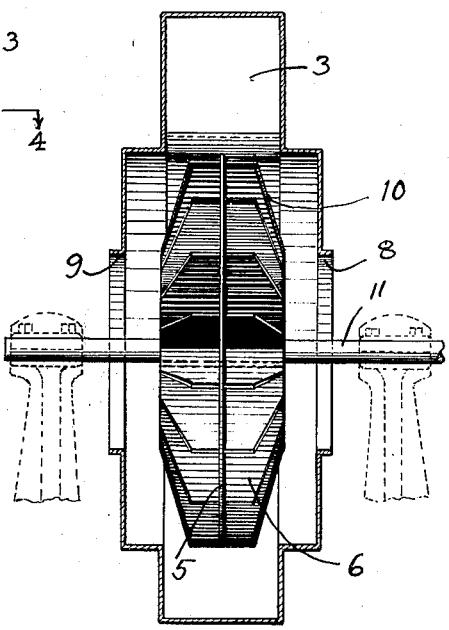
Fig. 2 is a section on the line 2—2 of Fig. 1, the rotor being shown in elevation.

In Fig. 3 is shown a blower design having a rotor with blades 6' on one side only of the disk 5' and a single inlet opening 8'. The rotor is driven by a shaft 11' extending through the casing, there being any suitable power means for driving the shaft. While my invention is adapted to the single intake type of blower it is preferable to use a double type such as shown in Fig. 2, for the reason that the rotor is thereby balanced against end thrust and the shaft 11 in Fig. 2 can have suitable bearings on both sides of the rotor.

Thus in Figs. 5 and 6 it will be seen that the blades $6^a$, $6^b$ respectively are tapered inwardly at a relatively small angle as at $10^a$, $10^b$ from points opposite the inlet openings $8^a$, $8^b$. In Fig. 5 the peripheral chamber $3^a$ of the casing is relatively small and the intake opening $8^a$ is relatively small, thus forming a relatively high pressure blower.

The blower shown in Fig. 6 is designed for delivering air at a somewhat lower pressure than that shown in Fig. 5 and has a casing in which the peripheral chamber $3^b$ has a considerably greater average cross sectional area than the chamber $3^a$ in the blower shown in Fig. 5, and in which the inlet opening $8^b$ has a greater diameter than the inlet $8^a$ in the modification shown in Fig. 5. The blades $6^b$ have their outer ends tapered from a point directly opposite the edge of the inlet opening to the ends thereof. Since the casing inlet $8^b$ is of larger diameter the blades $6^b$ project a shorter distance beyond the edge of the opening and to obtain the best results the outer ends of the blades $6^b$ should be tapered at a slightly larger angle than the blades $6^a$ of the high pressure blower shown in Fig. 5, in order to obtain a sufficient clearance between the blades and the casing wall. Of course too much of the ends of the blades cannot be removed, otherwise they lose their effectiveness.

Figs. 7 and 8 show blowers in which the enlarged chamber adjacent the open side of the impeller is produced by inclining the casing wall instead of cutting off or tapering the corners of the blades. This in effect produces a chamber of substantially the same cross sectional area as equivalent blowers of the type shown in Figs. 5 and 6 and thus accomplishes a similar result. In Fig. 7 the casing $3^c$ has an inlet $8^c$ and between the volute part of the casing and the inlet the casing is sloped inwardly at 12, so that the inner edge of the opening $8^c$ is spaced an appropriate distance from the edges of the blades and the enlarged chamber 13 in the casing just inside of the volute is formed. The blades $6^c$ of the rotor in this instance are of the same width throughout their length. Fig. 8 is similar to Fig. 7 with the exception that the casing 3$^d$ and openings 8$^d$ are designed for a relatively higher pressure blower.

Of course when the extreme is reached in the design of a blower for the largest volume at a relatively low pressure, the openings are of the same diameter as the diameter of the blades and the blades are rectangular as they appear in Fig. 8. The sides of the casing are parallel and a large volute is used, the opening being set in to be the appropriate distance from the edges of the blades, and that for a low pressure blower is equal to the width of the blades.

It will thus be seen by comparing the figures of the drawing showing the various types or designs of blowers that it is preferable to have the ends of the rotor blades spaced from the side walls of the casing in varying amounts but always substantially as great a distance as the width of the blades.

It will therefore be seen that the size of the peripheral discharge chamber, the diameter of the inlet opening, and the clearance between the rotor and the edge of the inlet opening all are increased, as the blower is designed to deliver a relatively large volume of fluid at a relatively low pressure and that these factors are designed to decrease, as the blower is designed to deliver fluid at a relatively higher pressure, and, in addition, for this type of blower the blades are tapered throughout a greater portion of their length to form an enlarged annular chamber adjacent their ends.

In all of the modifications herein shown the outer portions of the rotor blades are so formed that substantially the entire area thereof is effective for generating pressure in the peripheral discharge chamber of the casing and for imparting velocity the air column therein and at the same time the sides of the casing and the casing inlet are so disposed with respect to the rotor that eddy currents are eliminated and the moving column of air in the peripheral chamber is enabled to exert an entraining action upon the air at the sides of the rotor and to draw a considerable amount of air directly from the inlet openings of the casing due to its velocity of movement so that a relatively large amount of power expended upon the rotor is effectively employed in drawing air through the inlets of the casing and moving the air in a steady stream toward the casing outlet with a minimum of interference due to eddy currents.

While in the blowers herein illustrated the blades are disposed radially and at right angles to the central disk, the principle of the invention is equally applicable to curved blades or blades disposed at an angle to radial lines, but preferably the blades should always be disposed at right angles to the central member, the essential feature being the relationship of the rotor blades to the casing and casing inlet, the tapered periphery of the blades extending radially outward into the casing from the inlet openings and the sides of the blades opposite the inlet openings lying in planes spaced inwardly from and parallel to the planes of the inlet openings.

Having fully described my invention what I claim and desire to secure by Letters Patent is:

1. In a blower the combination with a casing having an axial inlet and a peripheral outlet, of a rotor within the casing and coaxial with the inlet opening, said rotor having blades extending from adjacent the axis radially outwardly, the outer side edges of the blades being disposed opposite the circumferential edge of the inlet and in a plane parallel with the plane of the inlet and spaced inwardly a distance substantially as great as half the width of the blades.

2. In a blower the combination with a volute casing having an axial inlet and a peripheral outlet, of a rotor disposed eccentrically in said casing and coaxial with the inlet, said rotor having blades extending from adjacent the axis radially outwardly, the side edges of the blades being spaced axially from the periphery of the inlet opening a distance substantially as great as half the width of the blades.

3. A structure as specified in claim 2, said blades being tapered at a relatively small angle from a point opposite the inlet opening to the ends thereof, whereby an enlarged passage is formed between the blades and the casing radially inwardly from said volute.

4. In a blower, the combination with a casing having an axial inlet and a peripheral outlet of a rotor within the casing of less diameter than the casing and coaxial with the inlet opening, said rotor comprising a disk with blades projecting laterally therefrom, said blades extending from adjacent the axis to the periphery of the disk, the outer side edges of the blades opposite the circumferential edge of the inlet lying in a plane parallel with the plane of the inlet and spaced inwardly a substantial distance from the plane of the inlet whereby a direct passage for air is provided past the side of the rotor from the inlet opening of the casing to the portion of the casing surrounding the rotor, the outer ends of the blades being spaced from the casing walls substantially as far as the width of the blades.

5. In a blower, the combination with a volute casing having an axial inlet and a peripheral outlet, of a rotor of less diameter than the casing and coaxial with the inlet, said rotor being eccentrically disposed with respect to the casing, said rotor comprising a disk with blades extending laterally therefrom, said blades extending from adjacent the axis to the periphery of the disk, the outer side edges of the blades opposite the periphery of the opening being spaced inwardly from the edge of the opening and the portions of the blades projecting past the edge of the opening being tapered inwardly away from the side wall of the casing so that the ends of said blades are spaced from the side wall of the casing a distance substantially as great as the width of the blades, said inlet opening being at least one-half the diameter of the rotor.

6. In a blower, the combination with a volute casing having alined openings in the side walls thereof and a peripheral discharge outlet, of a rotor within the casing coaxial with the openings and of less diameter than the casing, said rotor comprising a central disk with blades projecting laterally from opposite faces thereof and extending from adjacent the axis to the periphery of the disk, said rotor being of a diameter not more than twice the diameter of the inlet openings, the outer side edges of the blades opposite the circumferential edges of the openings lying in a plane parallel with the plane of the opening and spaced inwardly a substantial distance from the edges of the openings whereby a direct passage for air is provided from the inlet openings past the sides of the rotor to the peripheral portion of the casing.

7. In a blower, the combination with a casing having alined openings in the side walls thereof and a peripheral discharge outlet, of a rotor within the casing coaxial with the openings and of substantially less diameter than the casing whereby a peripheral chamber is provided beyond the periphery of the rotor, said rotor having blades radiating from a central hub, the portion of said rotor lying between the openings being uniform in width and parallel with the planes of the openings, the rotor being of such width that the outer sides thereof are spaced inwardly from the openings, said rotor being of a diameter not more than twice the diameter of the openings, the blades having squared outer ends and tapered at their side edges from their outer ends to points directly opposite the circumferential edges of the openings whereby the outer ends of the blades are spaced a substantially greater distance from the side walls of the casing.

8. In a blower, the combination with a volute casing having an opening in the side wall thereof, and a peripheral discharge outlet, of a rotor within the casing coaxial with the casing and of less diameter than the casing, whereby a peripheral chamber is provided beyond the periphery of the rotor, said rotor having blades radiating from the central portion, the edges of the blades opposing the circumferential edges defining said opening in the side wall of the casing lying in a plane substantially parallel with the plane of the opening and spaced inwardly a substantial distance from the edges of the opening, and the edges of the blades at the outer ends thereof being spaced a relatively greater distance from the side wall of the casing than adjacent the inlet.

In testimony whereof, I hereunto affix my signature.

ADOLPH WAHLE.